United States Patent [19]
Kimura

[11] Patent Number: 4,632,436
[45] Date of Patent: Dec. 30, 1986

[54] DEVICE FOR CONNECTING TUBES OR THE LIKE

[75] Inventor: Shigeru Kimura, Kamakura, Japan

[73] Assignee: Nifco Inc., Yokohama, Japan

[21] Appl. No.: 772,367

[22] Filed: Sep. 4, 1985

[30] Foreign Application Priority Data

Sep. 7, 1984 [JP] Japan ............................ 59-135095[U]

[51] Int. Cl.$^4$ ............................................. F16L 37/14
[52] U.S. Cl. ...................................... 285/305; 285/321
[58] Field of Search ........................ 285/305, 321, 921

[56] References Cited

U.S. PATENT DOCUMENTS

| | | | |
|---|---|---|---|
| 2,092,243 | 9/1937 | Breese | 285/305 X |
| 3,584,902 | 6/1971 | Vyse | 285/305 |
| 3,753,582 | 8/1973 | Graham | 285/305 |
| 4,009,896 | 3/1977 | Brewer | 285/305 |
| 4,244,608 | 1/1981 | Stuemky | 285/305 |
| 4,524,995 | 6/1985 | Bartholomew | 285/305 X |
| 4,541,657 | 9/1985 | Smyth | 285/305 |
| 4,561,682 | 12/1985 | Tisserat | 285/305 |

FOREIGN PATENT DOCUMENTS 2839635  4/1979  Fed. Rep. of Germany ...... 285/305

Primary Examiner—Thomas F. Callaghan
Attorney, Agent, or Firm—Trexler, Bushnell & Wolters, Ltd.

[57] ABSTRACT

A device for connecting tubes or the like comprises a male coupler provided on one end of a tube or pipe to be connected, the male coupler having a cylindrical engagement portion having a tapered end and also having engagement projections formed on its outer periphery, a female coupler provided on one end of another tube or pipe, the female coupler having radially penetrating windows, and a lock member adapted to be inserted through the windows of the female coupler to engage the cylindrical engagement portion of the male member when inserted in the female member. The male and female couplers are held in engagement with each other by engagement between the lock member and the engagement projections of the male member and are readily disengaged from each other by pushing the lock member.

4 Claims, 7 Drawing Figures

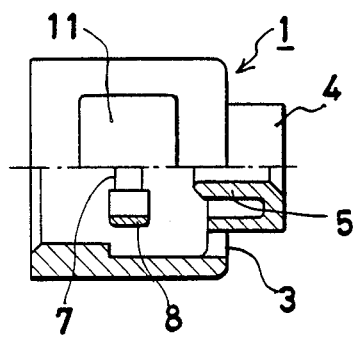
FIG_1
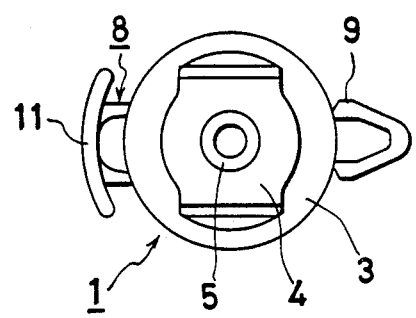
FIG_2
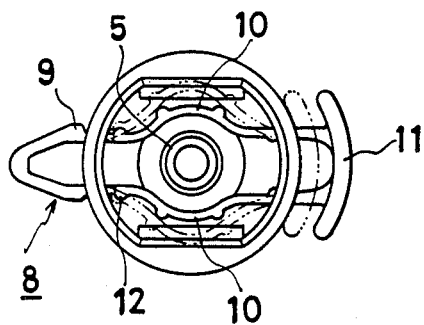
FIG_3
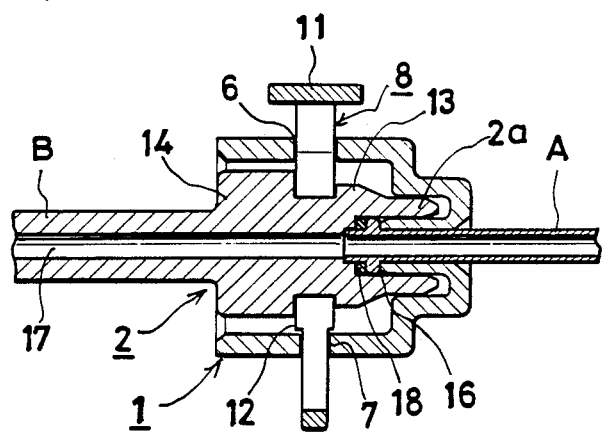
FIG_4

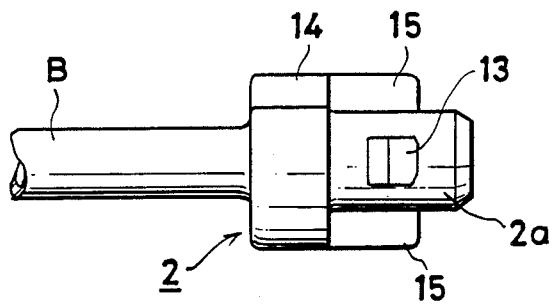
FIG_5
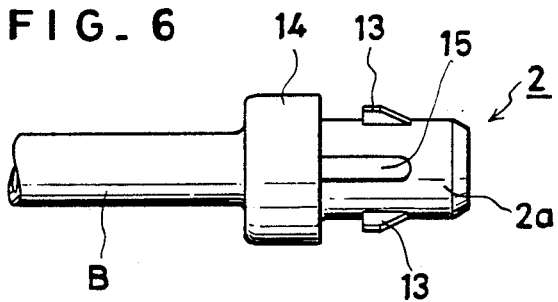
FIG_6
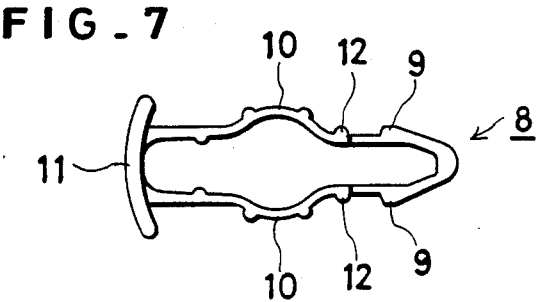
FIG_7

DEVICE FOR CONNECTING TUBES OR THE LIKE

FIELD OF THE INVENTION AND RELATED ART STATEMENT

This invention relates to a connecting device suitable as means for connecting tubes or the like for transporting a fluid and, more particularly, to a connecting device which comprises a male coupler and female coupler which are provided on ends of tubes or the like to be connected together and permits gas-tight or liquid-tight connection of the tubes or the like by pushing the male coupler into the female coupler and easy disconnection of tubes or the like by pushing a lock member provided in one of the two couplers.

A connecting device is usually used for connecting and disconnecting tubes or pipes used for a fluid supply system. It is desired that the devices of this type be capable of being simply mounted and removed and that they ensure reliable gas-tightness or water-tightness.

A prior art device of this type is disclosed, for instance, in Japanese Utility Model Publication SHO 59(1984)-41522. The disclosed device comprises an outer cylinder and an inner cylinder which can be fitted together. The inner cylinder has a plurality of pins projecting from its outer peripheral surface, while the outer cylinder has a substantially J-shaped groove extending from an edge thereof for receiving the pins. When coupling together the outer and inner cylinders, the pins of the inner cylinder are received in the J-shaped groove of the outer cylinder and moved toward the inner end of the groove. The pins can be brought to the inner end of the J-shaped groove by inserting the pins in the groove from the outer end thereof in the axial direction, then turning the inner cylinder such that the pins are moved in the circumferential direction and then slightly returning the pins in the axial direction. When the inner and outer cylinders are coupled together, they are spring biased toward each other by a spring so that the pins will not be readily detached from the J-shaped groove. However, if a force surpassing the biasing force of the spring is exerted to the inner and outer cylinders in the normal working state, the detachment of the pins from the J-shaped groove is liable to result. Further, the coupled state is not positively maintained, so that the rattling is likely. With the prior art connecting device, the coupled state is instable, and the reliability is inferior.

OBJECT AND SUMMARY OF THE INVENTION

An object of the invention is to provide a device for connecting tubes or the like, which can easily and reliably connect and disconnect two tubes or pipes and ensure gas-tightness or water-tightness.

To attain the above object of the invention, there is provided a device for connecting tubes or the like, which comprises a male coupler provided on one end of a tube or a pipe to be connected and having a cylindrical engagement portion having a tapered end and also having an engagement projection formed on the outer periphery, a female coupler provided on one end of another tube or pipe, the female coupler having a diameter capable of receiving the male coupler and being provided with radially penetrating windows, and a lock member having two legs with elasticity provided therebetween, the lock member being inserted through the windows of the female coupler for clamping the male coupler inserted in the female coupler after the engagement projection has passed by the lock member.

The lock member is inserted through the windows of the female coupler in advance. Then, the two couplers are coupled together by inserting the male coupler into the female coupler through an opening thereof, thus causing the lock member to engage with the engagement portion of the male member. To release the coupling of the couplers, the end of the lock member is depressed, whereby the lock member is spread against its elasticity in the female coupler so that it is released from engagement with the engagement portion. In this way, the two couplers are released from each other.

The tubes or pipes thus can be connected and disconnected by simple operation of the lock member, and they can be held tightly connected together.

The above and other objects and features of the invention will become more apparent from the following detailed description made with reference to the accompanying drawings.

BRIEF DESCRIPTION OF THE DRAWINGS

FIG. 1 is a front view, partly in section, showing a female coupler of one embodiment of the device for connecting tubes or the like according to the present invention;

FIG. 2 is a right side view of the female coupler of FIG. 1;

FIG. 3 is a left side view of the female coupler of FIG. 1;

FIG. 4 is a laterally sectioned plan view showing one embodiment of the device according to the present invention with two tubes coupled together;

FIG. 5 is a plan view showing a male coupler of one embodiment of the device according to the present invention;

FIG. 6 is a front view showing the male coupler of FIG. 5; and

FIG. 7 is a plan view showing a lock member of one embodiment of the device according to the present invention.

DETAILED DESCRIPTION OF THE PREFERRED EMBODIMENT

An embodiment of the connecting device according to the invention will now be described with reference to the drawings.

A female coupler 1 is a cylindrical member having one end closed by an end wall 3 which has a cup-like central outer extension 4 which has a coaxial inner cylindrical portion 5, which supports an end portion of a tube "A" inserted through it. The main cylindrical portion of the female coupler 1 has a large window 6 and a small window 7, these windows being formed substantially in an axially central portion at diametrically opposite positions. A U-shaped lock member 8 penetrates the windows 6 and 7.

The lock member 8 serves to ensure the connection of the tubes "A" and "B" by locking a male coupler 2 inserted in the female coupler 1 from an opening thereof. As shown in FIG. 7, the lock member 8 is substantially U-shaped and has engagement jaws 9 formed near its tip. The leg portions of the lock member 8 extending from the engagement jaws 9 have intermediate, outwardly arcuate portions 10 provided at like positions. A plate-like push member 11 is provided on the ends of the legs. Portions of the legs between the outwardly arcuate portions 10 and engagement jaws 9 have locking projections 12 facing the engagement jaws 9.

The lock member 8 is made of a metal or a synthetic resin having elasticity. In this embodiment, the lock member 8 is made of a polypropyrene resin, and a spring force is provided between the two legs in advance.

The lock member 8 is mounted by inserting it through the large window 6, the inner space and the small window 7 of the main cylindrical portion of the female coupler and hooking the engagement jaws 9 on the edges of the window 7 so that the arcuate portions 10 provided on the two legs extend in the inner space of the main cylindrical portion.

FIG. 3 shows the lock member 8 in a mounted state. When the lock member 8 is once mounted, it is retained in position with the engagement jaws 9 hooked in the window 7. In this state, the arcuate portions 10 are located in a central portion of the inner space, and the plate-like push member 11 at the rear end of the lock member 8 projects from the outer periphery of the main cylindrical portion. By pushing the projecting plate-like push member 11 with a finger, the locking projections 12 of the two legs engage with the edges of the window 7, so that the lock member 8 is retained and prevented from detachment in the direction of advance. Thus, portions of the legs centered on the arcuate portions 10 are expanded as shown by chain lines in FIG. 2.

The male coupler 2 has a cylindrical engagement portion 2a integral with a tube "B" and a plurality of engagement projections 13 provided on the outer periphery of the engagement portion 2a. In this embodiment, the male coupler 2 has a flange 14 having a large thickness provided on a rear end outer periphery portion of the engagement portion 2a and two axial ridges 15 forwardly extending from the flange 14.

The engagement portion 2a is a small diameter circular portion capable of being fitted in the female coupler 1, and the rear end flange 14 has an outer diameter approximately equal to the inner diameter of the female coupler so that rattling will not occur when the two couplers are fitted together.

The engagement projections 13 are adapted to engage with the lock member 8 when the male member 2 is fitted in the female member 1. In this embodiment, each of engagement projections 13 has a tapered front surface so that it can readily pass through the lock member 8 when the male member 2 is fitted.

With the above construction of the device according to the invention, the male coupler is made integral with the tube "B" while the other tube "A" is inserted through the inner cylindrical portion 5 with a flange-like outer projection at an end of the tube "A" engaged with the end of the inner cylindrical portion 5.

To couple together the two couplers 1 and 2 provided on the mating ends of the respective tubes, the male coupler 2 is inserted into the female coupler 1 from the open end thereof. In this way, the tubes are connected together.

As the male coupler 2 is inserted, the end of the engagement portion 2a forces apart the arcuate portions 10 of the lock member 8 inserted in the female coupler 1. Thus, the inner cylindrical portion 5 is received together with the end portion of the tube "A" retained in the portion 5 in the inner space of the female member 1. At this time, the passage 17 of the tube "B" is communicated with the tube "A".

When the tube "A" is engaged with the shoulder of the male coupler provided adjacent to the passage 17, the engagement projections 13 provided on the outer periphery of the engagement portion 2a having cleared the arcuate portions 10 engage with these portions 10, so that the male member 2 is retained in position.

As has been shown, the two couplers are coupled together by merely forcibly inserting the male coupler 2. The coupling of the two couplers can be released by depressing the push member 11 of the lock member 8 held in the female coupler 1.

When the push member 11 is pushed by the finger against the outer periphery of the female coupler, the arcuate portions 10 are flexed in an expanding fashion because the locking projections 12 are in engagement with the edges of the window 7. As the arcuate portions 10 are flexed, they are released from engagement with the engagement projections 13, so that the male coupler can be pulled out to effect disconnection of the tubes.

As has been described in the foregoing with the coupling device according to the invention, the tubes "A" and "B" can be connected together by a simple operation of merely forcibly inserting the male coupler 2 into the female coupler 1, and the two couplers can be released from the coupled state by pushing the push member of the lock member held in the female coupler. The device thus can be very conveniently handled. Further, the tubes which are coupled together by the two couplers can be connected together in gas-tight or water-tight condition by providing a seal member, e.g., an O-ring 18, between the joined ends of the two tubes. The device thus is suitable as a means for connecting fluid transport tubes or the like.

Further, when the axial ridges 15 provided on the outer periphery of the engagement portion 2a in the above embodiment are passed through between the two legs of the lock member in the coupling operation, they have the effect of assuring that the engagement between the arcuate portions 10 and engagement projections 13 can be reliably obtained. Also, since the arcuate portions 10, which are flexed to the greatest extent and can be readily expanded, directly face the engagement projections 13, the couplers can be easily disengaged.

What is claimed is:

1. A device for connecting tubes or the like, comprising a male coupler provided on one end of a tube or a pipe to be connected, said male coupler having a cylindrical engagement portion having a tapered end and also having engagement projections formed on its outer periphery, a female coupler provided on one end of another tube or pipe, said female coupler having a diameter capable of receiving said male coupler and also having radially penetrating windows, and a lock member having two legs with elasticity provided therebetween, said lock member being inserted through said windows of said female coupler and said male coupler being inserted in said female coupler to cause said engagement projections to pass through said lock member, whereby the male and female couplers are held in engagement, said legs at an entering end being tapered toward one another and joined at an apex and having retaining projections adjacent said apex and preventing withdrawal through a respective window, said legs further having locking projections spaced from said retaining projections away from said apex and limiting insertional movement through said respective window, said legs being joined at a remote end by a plate-like push member for manual engagement resiliently to spread said legs to permit withdrawal of said male coupler from said lock member.

2. The device for connecting tubes or the like according to claim 1, wherein said female coupler has a coaxial inner cylindrical portion and the end of a tube or a pipe coupled to said female coupler is provided with a flange-like outer projection engaging with the end of said inner cylindrical portion, through which said tube or pipe is inserted.

3. The device for connecting tubes or the like according to claim 1, wherein said male coupler has a flange provided at a position spaced apart from said engagement projection and an axial ridge extending forwardly from said flange.

4. A device for connecting tubes or the like according to claim 1 wherein said male coupler further has oppositely projecting axial ridges thereon fitting between said lock member legs and orienting said male coupler relative to said lock member to cause said engagement projections to engage and lock behind said lock member.

* * * * *